(12) United States Patent
Park et al.

(10) Patent No.: US 12,441,041 B2
(45) Date of Patent: Oct. 14, 2025

(54) HIGH-SPEED MOLDING DEVICE

(71) Applicant: HYOSUNG HEAVY INDUSTRIES CORPORATION, Seoul (KR)

(72) Inventors: Jung Woo Park, Changwon-si (KR); Dong Woen Lee, Changwon-si (KR); Young Soo Chung, Changwon-si (KR); Hyeon Gweon Cheon, Gimhae-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 18/569,202

(22) PCT Filed: Nov. 17, 2022

(86) PCT No.: PCT/KR2022/018188
§ 371 (c)(1),
(2) Date: Dec. 11, 2023

(87) PCT Pub. No.: WO2023/153592
PCT Pub. Date: Aug. 17, 2023

(65) Prior Publication Data
US 2024/0278466 A1    Aug. 22, 2024

(30) Foreign Application Priority Data

Feb. 14, 2022  (KR) ........................ 10-2022-0019125

(51) Int. Cl.
*B29C 45/34* (2006.01)
*B29C 45/14* (2006.01)

(52) U.S. Cl.
CPC ........ *B29C 45/34* (2013.01); *B29C 45/14065* (2013.01)

(58) Field of Classification Search
None
See application file for complete search history.

(56) References Cited

U.S. PATENT DOCUMENTS

| | | | |
|---|---|---|---|
| 2008/0206393 A1* | 8/2008 | Kim ..................... | B22D 17/145 425/546 |
| 2011/0304077 A1* | 12/2011 | Sakamoto ............... | B29C 45/34 264/328.7 |
| 2016/0240396 A1* | 8/2016 | Cheon ..................... | B29C 45/34 |

FOREIGN PATENT DOCUMENTS

| | | |
|---|---|---|
| KR | 100857970 B1 | 9/2008 |
| KR | 20110023652 A | 3/2011 |
| KR | 20130074935 B1 | 7/2013 |
| KR | 20140138376 A | 12/2014 |
| KR | 101595311 B1 | 2/2016 |
| KR | 20160142549 A | 12/2016 |
| KR | 101694204 B1 | 1/2017 |

(Continued)

OTHER PUBLICATIONS

Wikipedia, https://en.wikipedia.org/wiki/Fastener (Year: 2021).*

*Primary Examiner* — Farah Taufiq
(74) *Attorney, Agent, or Firm* — NKL Law; Jae Youn Kim

(57) ABSTRACT

The present disclosure is a high-speed molding device. According to the present invention, a product 14 may be manufactured by filling resin in a cavity 12 formed by a first mold 10 and a second mold. A gas generated during the filling of the cavity 12 with the resin may be discharged through a vent unit 20. The vent unit 20 has a first flow path 23 and a second flow path 33 to discharge the gas, while the resin is allowed to flow up to only the first flow path 23.

4 Claims, 7 Drawing Sheets

(56) References Cited

FOREIGN PATENT DOCUMENTS

KR 102150726 B1 9/2020
WO WO-2018098564 A1 * 6/2018 ............. B29C 49/06

* cited by examiner

HIGH-SPEED MOLDING DEVICE

TECHNICAL FIELD

The present disclosure relates to a high-speed molding device.

BACKGROUND ART

A molding device is a device that injects a resin into a cavity formed therein to produce a product having the same shape as that of the cavity. Generally, in such a molding device, when a first mold body and a second mold body are coupled to each other, a cavity is formed therein, and the resin is injected into the cavity and then cured to form a product having a predetermined shape.

In the cavity, components constituting a part of the product manufactured in the cavity may be inserted. In this way, making a product by inserting a part into the cavity and injecting resin is also called insert molding.

When the resin is injected into the cavity, an unmolded portion not filled with resin is not created inside the cavity when the pressure is above atmospheric pressure. When the resin is injected into the cavity at a pressure higher than or equal to the atmospheric pressure, the gas inside the cavity is easily discharged to the outside and the time taken for the resin to be injected is shortened, but the resin filled in the cavity also escapes a lot to the outside.

Accordingly, it is a necessary feature of a high-speed molding device to produce a product quickly while minimizing the resin escaping out of the cavity.

In the high-speed molding device as described above, the resin may escape to the outside through a section where the gas in the cavity is vented to the outside. Therefore, if a portion of the resin remains in a vent flow path and is cured, the gas is prevented from venting to the outside during the next product production operation, resulting in an unmolded portion in the product.

In addition, when a component inserted into the cavity is used to seal the cavity, it is very difficult to vent the gas out of the cavity during the resin injection process.

Prior arts related to a high-speed molding device described above include Korean Patent Registration No. 10-1694204, and Korean Patent Registration No. 10-1326606.

DISCLOSURE

Technical Problem

An object of the present disclosure is to completely mold a product in a high-speed molding device.

Another object of the present disclosure is to minimize the time for molding a product in the high-speed molding device.

A further object of the present disclosure is to securely attach a vent unit to an insert part in the high-speed molding device.

A further object of the present disclosure is to facilitate cleaning of the vent unit used in the high-speed molding device.

Technical Solution

In order to achieve the above-described objects, a high-speed molding device of the present disclosure may comprise: a first mold and a second mold which are coupled and separated from each other by forming a cavity; and a vent unit provided through a communication hole communicating with the cavity and the outside and having a first vent flow path through which gas and resin flow, and a second vent flow path having a flow cross-sectional area smaller than that of the first vent flow path and through which gas flows, wherein the vent unit comprises a first vent body having the first vent flow path formed therein and a second vent body detachably coupled to the first vent body, and a second vent flow path communicating with the first vent flow path may be formed between the first vent body and the second vent body.

The first vent body may be fastened to a fastening piece provided in an insert part inserted into the cavity.

The first vent flow path of the first vent body may communicate with the cavity through a fastening hole formed in the fastening piece.

The second vent flow path may be formed to have a height less than the width, such that the cross-section may be rectangular.

A flange may be further formed to surround the outer surface of the first vent body.

A first concavo-convex portion may be formed in the first vent body to couple the first vent body and the second vent body, and a second concavo-convex portion may be formed on the second vent body to couple to the first concavo-convex portion.

An installation space in which the vent unit is installed may be formed on at least one of the first mold and the second mold. A fixing plate may be installed at an entrance of the installation space, and a press for pressing the second vent body to the first vent body may be installed through the fixing plate.

The first vent flow path may be formed such that an inner diameter of an inlet side thereof adjacent to the cavity is smaller than an inner diameter of an outlet side thereof.

The first vent flow path and the second vent flow path are connected orthogonally, and the second vent flow path may be formed by penetrating the first vent body or the second vent body in the width direction.

Advantageous Effects

A high-speed molding device according to the present disclosure may have at least one of the following effects.

In the present disclosure, a flow cross-sectional area of a second vent flow path formed in a second vent body and communicating with the outside of the molding device is relatively small compared to the flow cross-sectional area of a first vent flow path formed in a first vent body and communicating with the inside of a cavity. Therefore, although gas in the cavity is smoothly vented through the first vent flow path and the second vent flow path, resin is allowed to flow only to the first vent flow path, so that no gas remains in the cavity, and at the same time, no unmolded part is produced, thereby perfectly molding the product.

In addition, in the present disclosure, although the resin is injected into the cavity at a predetermined pressure, the resin is not arbitrarily discharged to the outside of the cavity, but may be discharged only to the first vent flow path having a relatively large flow cross-sectional area, so that the resin may be rapidly injected into the cavity, thereby relatively reducing the time required for product molding.

In addition, a vent unit may be reused by separating the first vent body from the second vent body and removing only the resin from the first vent flow path formed on the first vent body. As a result, the time required to mold one product and set up the molding device to mole the next product is shortened, thereby reducing the overall time required for product molding.

In the present disclosure, the first vent body constituting a vent unit may be attached to an insert part located in a cavity. Therefore, the vent unit may be more firmly installed in the molding device.

In addition, since the vent unit is attached to the insert part, which is a part of the product, when the mold is opened, the vent unit may be separated from the molding device along with the product. In addition, the first vent flow path penetrating the first vent body has a relatively larger flow cross-sectional area at the outlet than at the inlet, allowing the cured resin to separate easily from the product.

DETAILED DESCRIPTION OG THE DISCLOSURE

Figure 1:
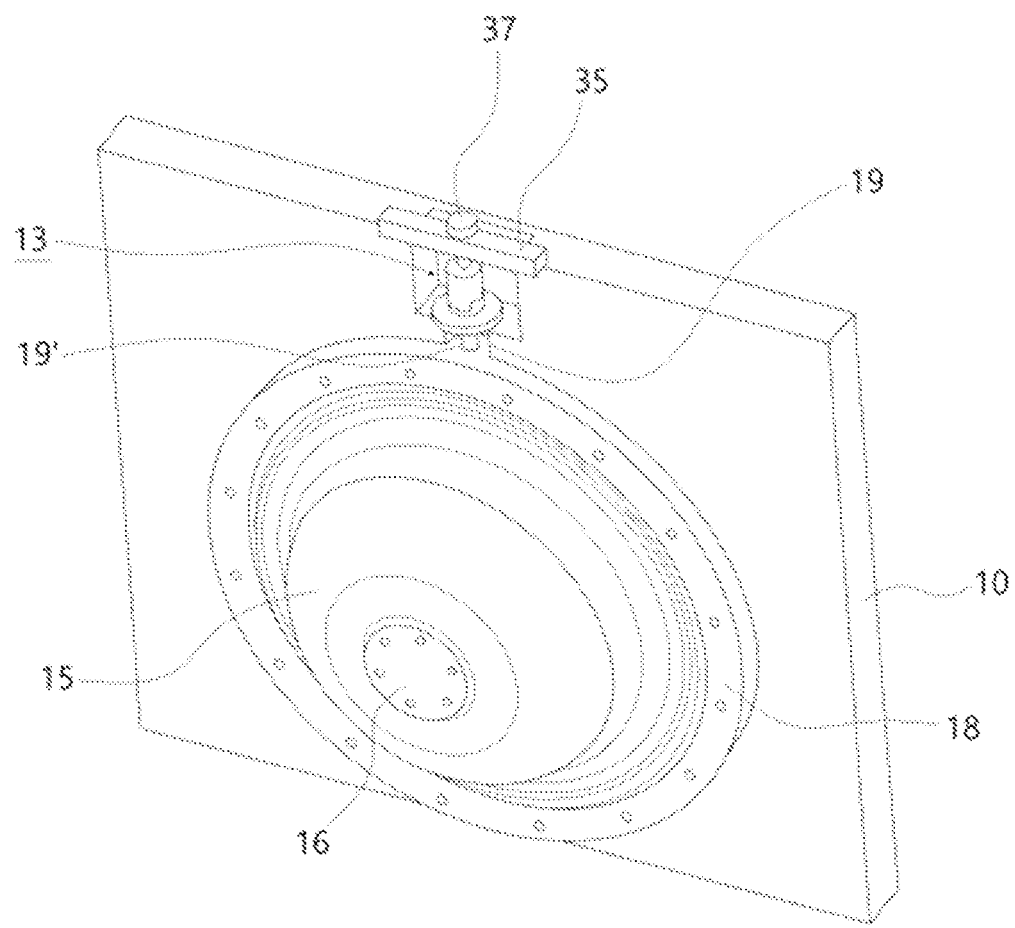
FIG. 1 is a perspective view showing a state in which a mold is removed from a high-speed molding device and a product is formed therein according to the present disclosure.

Hereinafter, some embodiments of the present disclosure will be described in detail with reference to exemplary drawings. In assigning reference numerals to the components of each drawing, it should be noted that the same components are given the same reference numerals as much as possible even though the same components are indicated on different drawings. In addition, in describing the embodiment of the present disclosure, if it is determined that a detailed description of a related known configuration or function interferes with the understanding of the embodiment of the present disclosure, the detailed description thereof will be omitted.

In addition, in describing the components of the embodiment of the present disclosure, terms such as first, second, A, B, (a), (b), etc. may be used. These terms are only used to distinguish between the components, and the nature, or order of the components are not limited by the terms. When a component is described as being "combined with", "coupled to" or "connected to" another component, the component may be directly connected to or combined with each other, but it should be understood that another component may be "connected to", "coupled to" or "combined with" each of the components therebetween.

Hereinafter, a configuration of a high-speed molding device according to an exemplary embodiment of the present disclosure will be described with reference to the accompanying drawings.

The molding device of the present disclosure may have a cavity 12 formed by a first mold 10 and a second mold (not shown). The cavity 12 may be formed by a concave portion formed in the first mold 10 and the second mold. A resin may be injected into the cavity 12 to form a predetermined product 14. An installation space 13 may be formed in the first mold 10. The installation space 13 may communicate with the cavity 12 through a communication hole 13'. The installation space 13 may communicate with the outside of the first mold 10.

Figure 2:
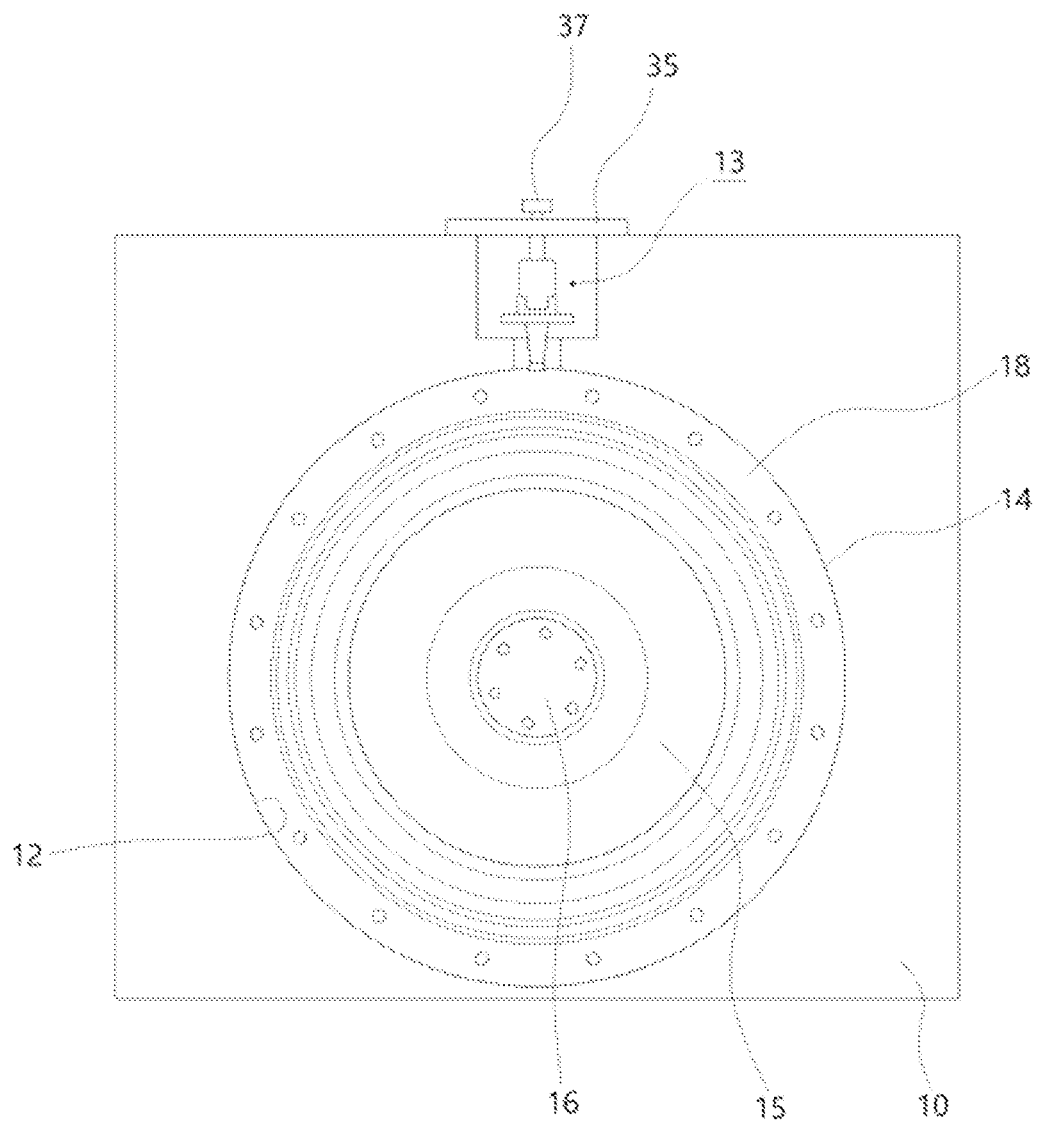
FIG. 2 is a front view showing the state of FIG. 1.
Figure 3:
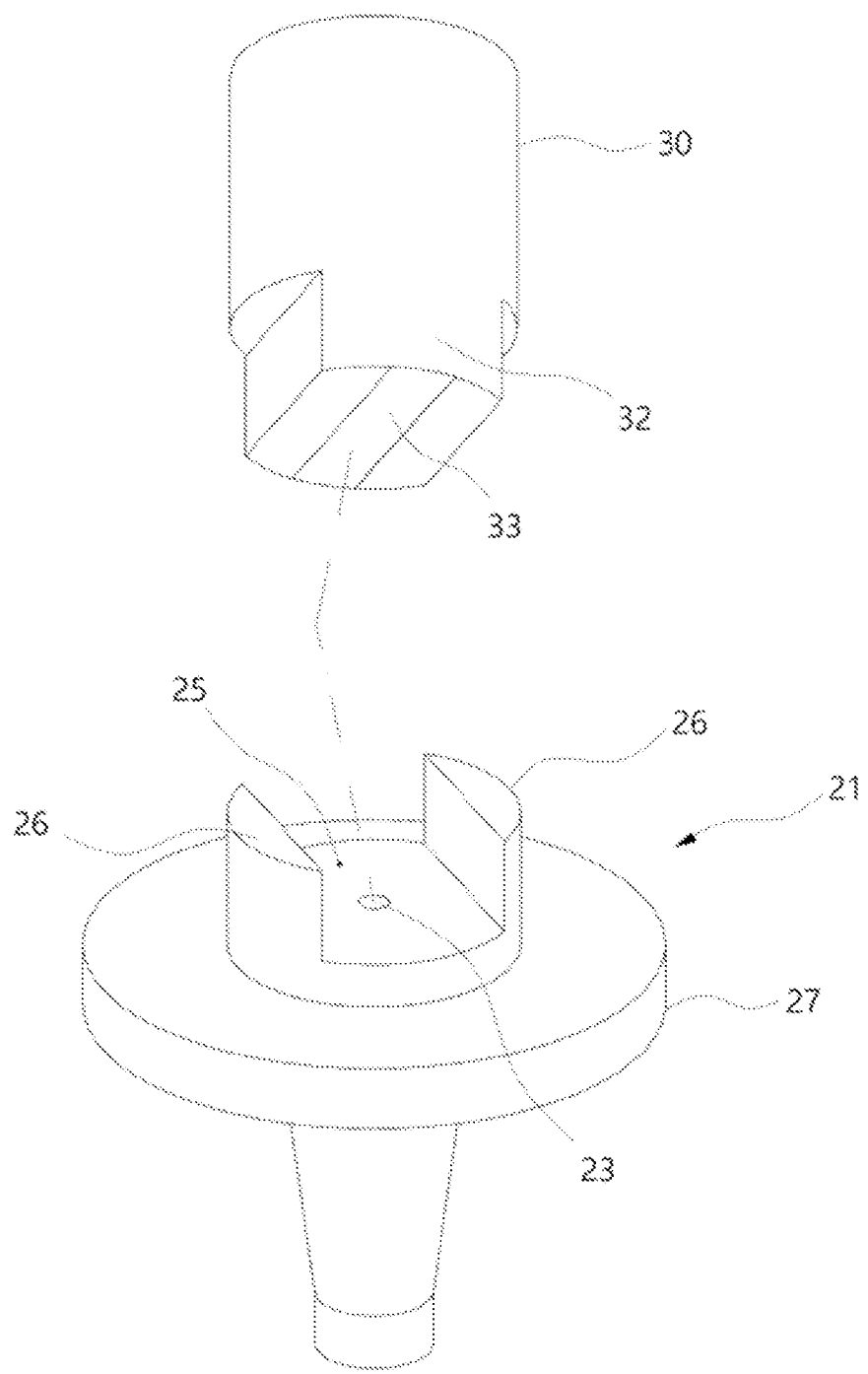
FIG. 3 is an exploded perspective view showing a first vent body and a second vent body separated from each other.
Figure 4:
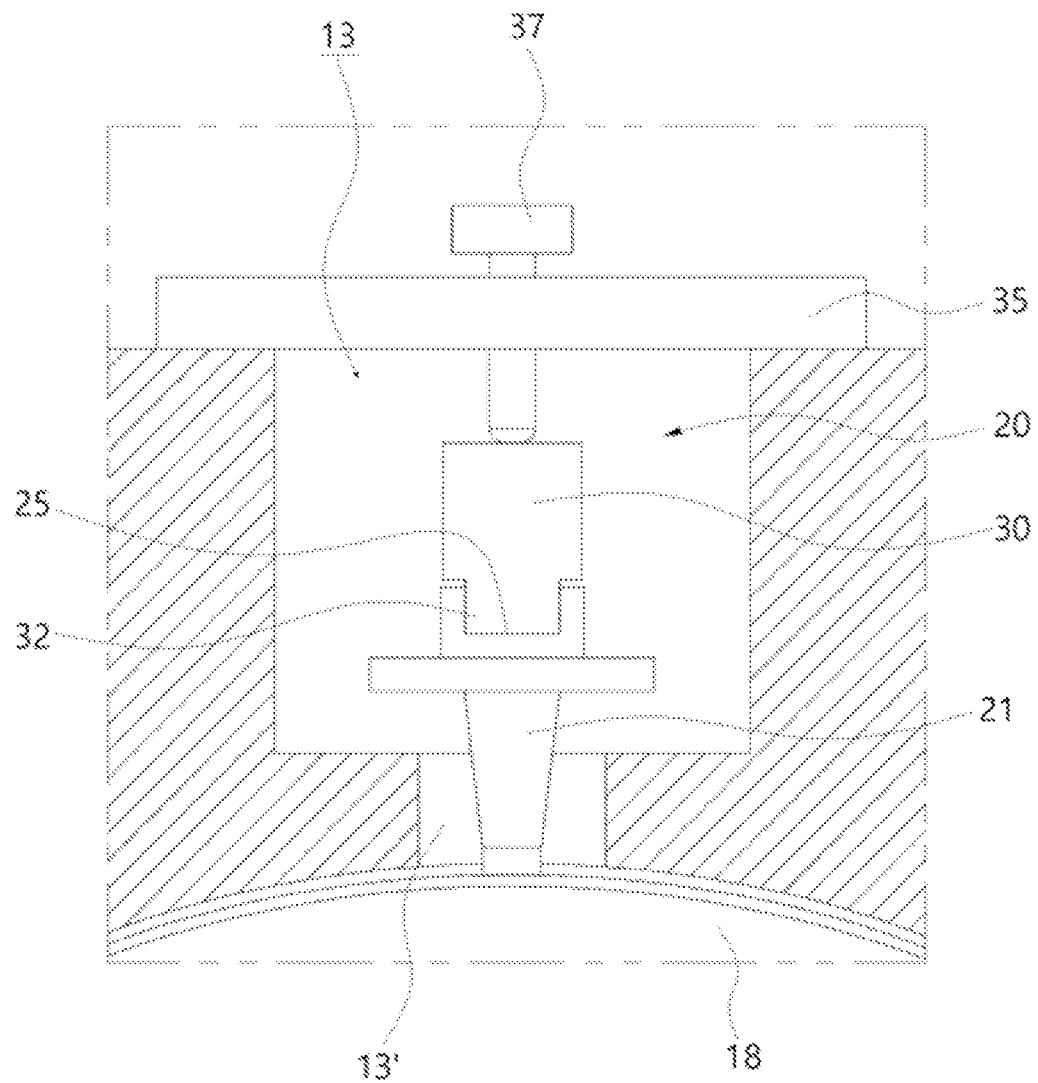
FIG. 4 is a partial cross-sectional view showing a state in which a vent unit is installed in a molding device.
Figure 5:
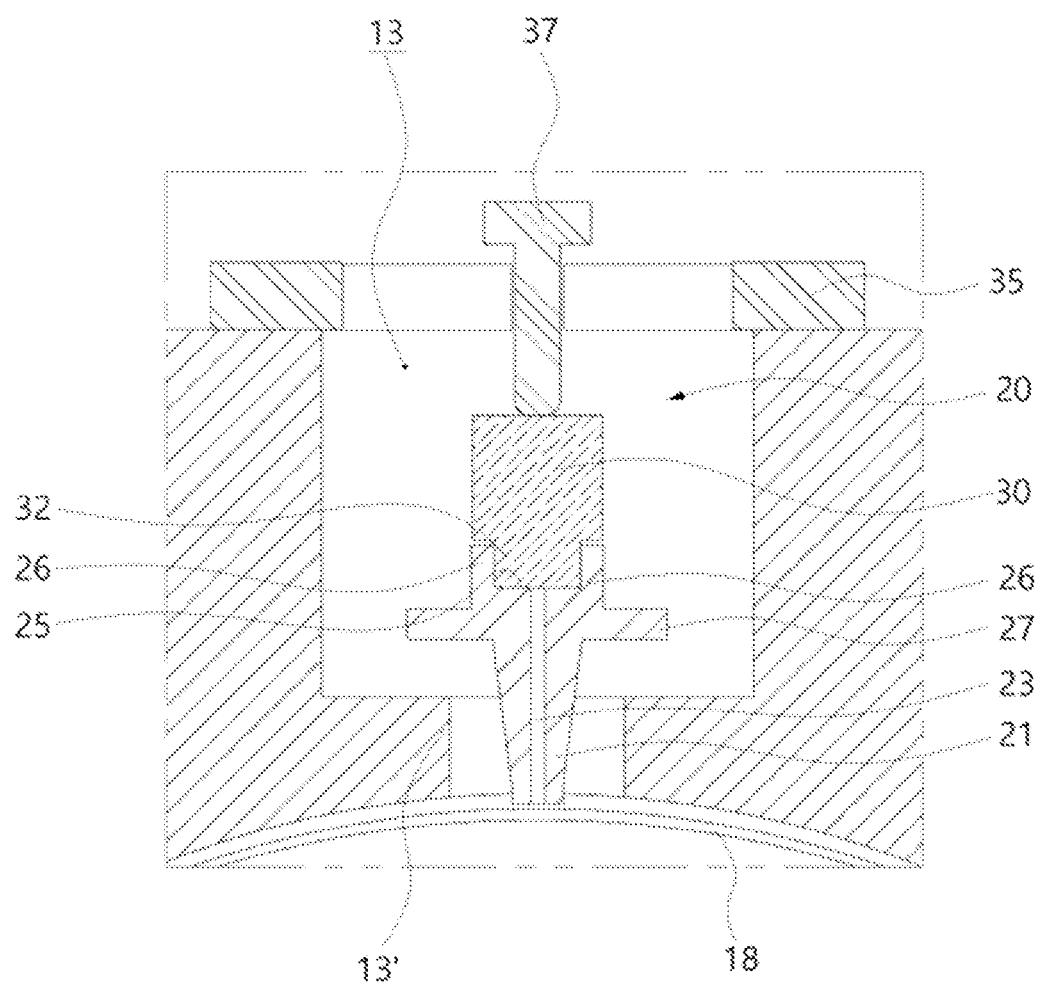
FIG. 5 is a cross-sectional view showing a vent unit in a configuration corresponding to FIG. 4.

FIGS. 1 and 2 show a state in which the product 14 is formed, and the product 14, for example, is presented as an example of a spacer connecting an enclosure The product 14 may have a resin body 15 of a predetermined shape formed by a synthetic resin and a connecting conductor, which is a first insert part 16, may pass through the center of the resin body 15. The connecting conductor may be positioned between the enclosure and the enclosure to electrically connect a conductor inside the enclosure. There may be a second insert part 18 that surrounds the edge of the product 14. The second insert part 18 is a ring flange forming an edge of the spacer.

The first insert part 16 and the second insert part 18 are previously positioned in the cavity 12, and the resin is integrated with the whole product 14 by being filled into the cavity 12 and cured. Here, the second insert part 18 may be installed to surround the inner surface of the cavity 12. That is, the second insert part 18 may form the exterior of the product 14 upon completion of the product 14. A fastening piece 19 may be provided at one side of the second insert part 18 as shown in FIG. 1. A fastening hole 19' may be formed through the fastening piece 19. The fastening hole 19' may communicate with a space in which the resin body 15 is formed.

A vent unit 20 may be installed in the installation space 13 and the cavity 12. The vent unit 20 may allow the gas inside the cavity 12 to be vented to the outside, and at the same time, allow some of the resins to be discharged in the cavity 12. The vent unit 20 may be inserted into the cavity 12 through the communication hole 13' and fastened to the second insert part 18.

The vent unit 20 includes a first vent body 21. The first vent body 21 may have a first vent flow path 23 formed through an inner center of the first vent body 21. A flow cross-sectional area of the first vent flow path 23 may gradually increase from an inlet to an outlet. That is, the inner diameter of the first vent flow path 23 may be relatively larger at the outlet than that of the inlet. However, the difference between the inner diameter of the inlet and the inner diameter of the outlet of the first vent flow path 23 is not large, so that it is impossible to identify when viewed visually. Gas and resin may flow through the first vent flow path 23.

One end of the first vent body 21 may be fastened to the fastening hole 19' of the fastening piece 19 of the second insert part 18. For this purpose, a male screw portion may be formed on the outer surface of the front end of the first vent body 21, and a female screw portion may be formed on the inner surface of the fastening hole 19'. Other structures may be used to fasten the first vent body 21 to the fastening hole 19'. For example, a method of press-fitting a key into a key groove may be used. In this case, the key should be hung in the key groove so that the key does not fall out directly in the longitudinal direction of the first vent body 21.

The other end of the first vent body 21 may have a first concavo-convex portion 25. Side walls 26 may be formed side by side on both sides of the other end of the first vent body 21 to form the first concavo-convex portion 25. The first concavo-convex portion 25 may be concavely formed by the presence of the side walls 26. The first vent flow path 23 may be open to the bottom of the first concavo-convex portion 25.

The outer surface of the middle portion of the first vent body 21 may have a flange 27. The flange 27 may have a disk shape. A resin, that may come out through the first vent flow path 23, may be positioned on the flange 27.

A second concavo-convex portion 32 of a second vent body 30 may be coupled to the first concavo-convex portion 25 of the first vent body 21. The second concavo-convex portion 32 may have a protruding shape in the present embodiment. Accordingly, the second concavo-convex portion 32 may be seated in the first concavo-convex portion 25. The second concavo-convex portion 32 may be disposed between the side walls 26 of the first concavo-convex portion 25. For this purpose, both side surfaces of the second concavo-convex portion 32 may be cut to be positioned between the side walls 26. That is, the width of the corresponding portion of the second concavo-convex portion 32 is slightly smaller than the distance between the side walls 26.

Figure 6:
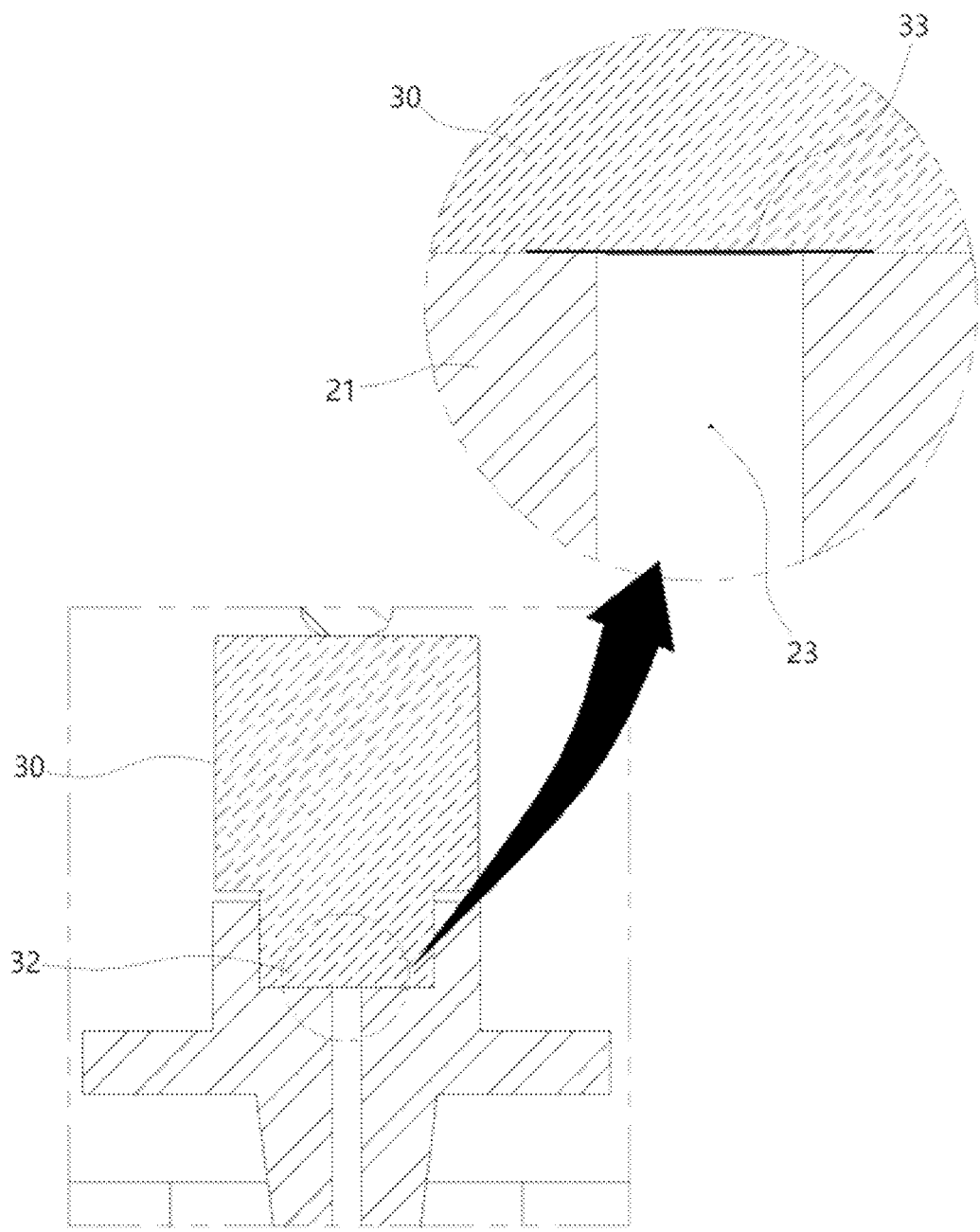
FIG. 6 is a cross-sectional view showing a first vent flow path and a second vent flow path formed in the first vent body and the first vent body.
Figure 7:
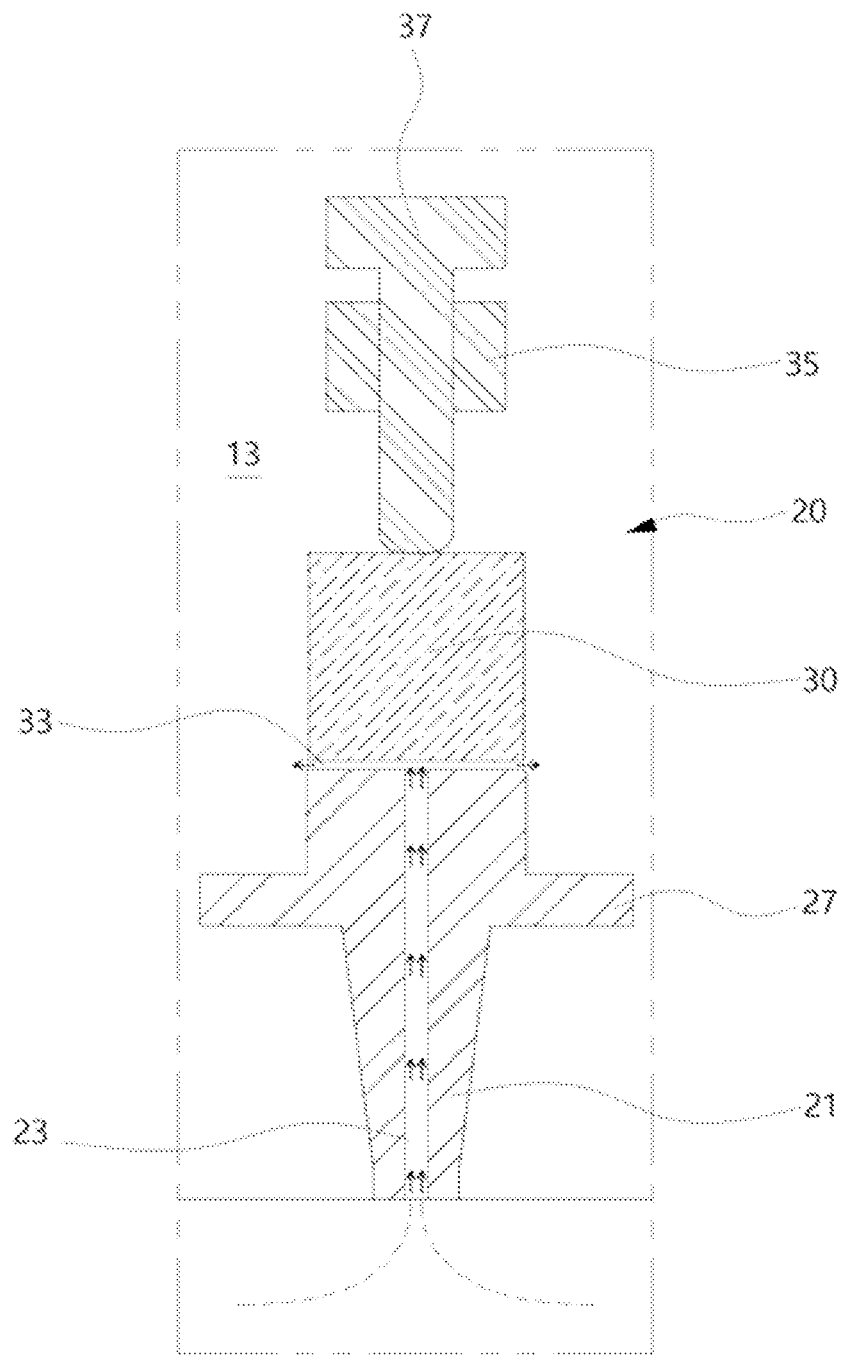
FIG. 7 is a view showing a state in which gas is vented through a first vent flow path and a second vent flow path and the movement of the resin according to an embodiment of the present disclosure.

A second vent flow path 33 may be formed on the front end surface of the second concavo-convex portion 32. The second vent flow path 33 is shown in FIG. 6, where the cross section thereof is rectangular. The flow cross-sectional area of the second vent flow path 33 is much smaller than that of the first vent flow path 23. The flow cross-sectional area of the second vent flow path 33 may be set so that gas may flow through the second vent flow path 33, but the resin may not flow. The second vent flow path 33 has a channel shape having a predetermined width and depth at the front end surface of the second concavo-convex portion 32. However, the second vent flow path 33 may be formed in a channel shape on the bottom surface of the first concavo-convex portion 25. Alternatively, the second vent flow path 33 may be formed by being divided into the first concavo-convex portion 25 and the second concavo-convex portion 32. The second vent flow path 33 and the first vent flow path 23 communicate with each other, and the flow sectional area of the first vent flow path 23 is much larger than that of the second vent flow path 33 so that the gas flows relatively well to the second vent flow path 33, but the resin does not flow to the second vent flow path 33.

The second vent flow path 33 may be orthogonal to the first vent flow path 23 at a middle portion thereof. The second vent flow path 33 may be formed to cross the second concavo-convex part 32 in a transverse direction. Accordingly, the first vent flow path 23 and the second vent flow path 33 may have a 'T' shape.

A fixing plate 35 may be installed at an entrance of the installation space 13 of the first mold 10. The fixing plate 35 may be fastened to the first mold 10 through a fastening element such as a screw. A press 37 may be installed through the fixing plate 35. The front end of the press 37 may be in close contact with the rear side of the second vent body 30. The press 37 may press the second vent body 30 to maintain a state in which the second vent body 30 is coupled to the first vent body 21. While the first vent body 21 is fastened to the second insert part 18 installed in the first mold 10, the press 37 may press the second vent body 30 to maintain a state of being coupled to the first vent body 21.

The vent unit 20 is located in the installation space 13 of the first mold 10. The installation space 13 may be located on a side opposite to the gravity direction of the first mold 10 based on the gravity direction. An injection hole (not shown) for injecting resin into the cavity 12 may be located opposite to the vent unit 20 installed in the installation space 13, that is, in a gravity direction.

Hereinafter, the use of the high-speed molding device according to the present disclosure having the above-described configuration will be described in detail.

The manufacturing of the product 14 in the molding device of the present disclosure is described. A first insert part 16 and a second insert part 18 are installed in the cavity 12 of the first mold 10 or the second mold 12. The vent unit 20 is fastened to the fastening hole 19' of the fastening piece 19 of the second insert part 18.

The first mold 10 and the second mold are combined to shield the cavity 12 from the outside. The outer surface of the second insert part 18 installed in the cavity 12 shields the communication hole 13' to block the installation space 13 and the cavity 12. The vent unit 20 is fastened to the fastening piece 19 of the second insert part 18 so that the cavity 12 and the first vent flow path 23 communicate with each other through the fastening hole 19'. For reference, the inside of the cavity 12 may be vacuumed.

In this state, the resin is injected into the cavity 12 through the injection hole at a pressure higher than atmospheric pressure. When the resin is injected into the cavity 12, the gas in the cavity 12 may flow through the first vent flow path 23 and the second vent flow path 33 to be vented to the installation space 13.

When the resin is completely filled in the cavity 12, the resin may flow through the first vent flow path 23 of the vent unit 20. This is because the first vent flow path 23 has a flow cross-sectional area through which resin may flow. However, the flow cross-sectional area of the second vent flow path 33 is very small, so the gas flows, but the resin may not flow through it. In particular, the width of the second vent flow path 33 is wider but the height of the second vent flow path 33 is smaller than the width of the second vent flow path 33. Accordingly, the resin discharged from the cavity 12 may flow and be filled in the first vent flow path 23, but may not flow to the second vent flow path 33.

When the resin is completely filled in the cavity 12, the resin body 15 is cured while lowering the temperature of the resin forming the resin body 15, and when the resin is cured to some extent, the product 14 is removed from the cavity 12. For this purpose, the first mold 10 and the second mold are separated, and the product 14 is removed from the cavity 12. At this point, in the product 14, the first insert part 16 and the second insert part 18 are formed integrally with the resin body 15 and are pulled out together.

When the product 14 is removed, the vent unit 20 may be removed along with the product. Of course, the press 37 is released so that the coupling between the second vent body 30 and the first vent body 21 may be released.

Accordingly, the first vent body 21 is removed along with the product 14, and the first vent body 21 is separated from the fastening piece 19 of the second insert part 18. In this process, the resin filled in the first vent flow path 23 and cured may be separated together with the first vent body 21. In particular, since the inner diameter of the inlet side of the first vent flow path 23 is smaller than the inner diameter of the outlet side thereof, the cured resin may be relatively easily separated from the resin body 15.

Meanwhile, when the first vent body 21 is separated from the product 14, the cured resin in the first vent flow path 23 may be removed by an operator. The cured resin may be easily separated through the outlet side of the first vent flow path 23, of which the inner diameter of the inlet side is smaller than the inner diameter of the outlet side.

In this way, the first vent body 21 may be reused in the production of the next product 14. That is, as described above, the vent unit 20 may be positioned in the installation space 13 by coupling the first vent body 21 to the fastening piece 19 of the second insert part 18 installed in the cavity 12 by being coupled to the second vent body 30.

For reference, the installation space 13 is formed in the first mold 10, and the installation space 13 may be formed in the second mold, or may be simultaneously formed in the first mold 10 and the second mold.

Even though it has been described that all components constituting the embodiments of the present disclosure are combined into one or operated in combination with each other, the present disclosure is not necessarily limited to the embodiments. That is, within the scope of the objective of the present disclosure, all of the components may be selectively combined into at least one and operated. In addition, the terms such as "include", "consist of", or "have" described above mean that the corresponding component may be present unless otherwise stated, and thus should be construed that the terms do not exclude other components, but may further include other components. All terms, including technical or scientific terms, have the same meaning as commonly understood by those skilled in the art to which the present disclosure belongs, unless defined otherwise. Generally used terms, such as terms defined in the dictionary, should be interpreted as being consistent with the contextual meaning of the related art, and should not be interpreted in an ideal or excessively formal meaning unless explicitly defined in the present disclosure.

The above description is merely illustrative of the technical idea of the present disclosure, and those skilled in the art to which the present disclosure belongs may perform various modification and changes within the scope not departing from the essential characteristics of the present disclosure. Accordingly, the embodiments disclosed in the present disclosure are not intended to limit, but to explain the technical idea of the present disclosure, and the scope of the technical spirit of the present disclosure is not limited by these embodiments. The scope of protection of the present disclosure should be interpreted by the claims below, and all technical spirits within the scope equivalent to the scope of the claims should be interpreted as being included in the scope of the claims of the present disclosure.

The invention claimed is:

1. A high-speed molding device comprising: a first mold and a second mold which are coupled and separated from each other by forming a cavity; and a vent unit provided through a communication hole communicating with the cavity and the outside, and having a first vent flow path through which gas and resin flow and a second vent flow path having a flow cross-sectional area smaller than that of the first vent flow path and through which gas flows, wherein the vent unit comprises a first vent body having the first vent flow path formed therein and a second vent body detachably coupled to the first vent body, and a second vent flow path communicating with the first vent flow path is formed between the first vent body and the second vent body, wherein first vent body is fastened to a fastening piece provided in an insert part inserted into the cavity, wherein the first vent flow path of the first vent body communicates with the cavity through a fastening hole formed in the fastening piece, wherein the second vent flow path is formed to have a height less than the width, such that the cross-section thereof is rectangular, wherein a first concavo-convex portion is formed in the first vent body to couple the first vent body and the second vent body, and a second concavo-convex portion is formed on the second vent body to couple to the first concavo-convex portion, and wherein an installation space in which the vent unit is installed is formed on at least one of the first mold and the second mold, wherein a fixing plate is installed at an entrance of the installation space, and a press for pressing the second vent body to the first vent body is installed through the fixing plate.

2. The high-speed molding device of claim 1, further comprising a flange surrounding an outer surface of the first vent body.

3. The high-speed molding device of claim 1, wherein the first vent flow path is formed such that an inner diameter of an inlet side thereof adjacent to the cavity is smaller than an inner diameter of an outlet side thereof.

4. The high-speed molding device of claim 3, wherein the first vent flow path and the second vent flow path are connected orthogonally, and the second vent flow path is formed by penetrating the first vent body or the second vent body in the width direction.

* * * * *